United States Patent Office 2,750,734
Patented June 19, 1956

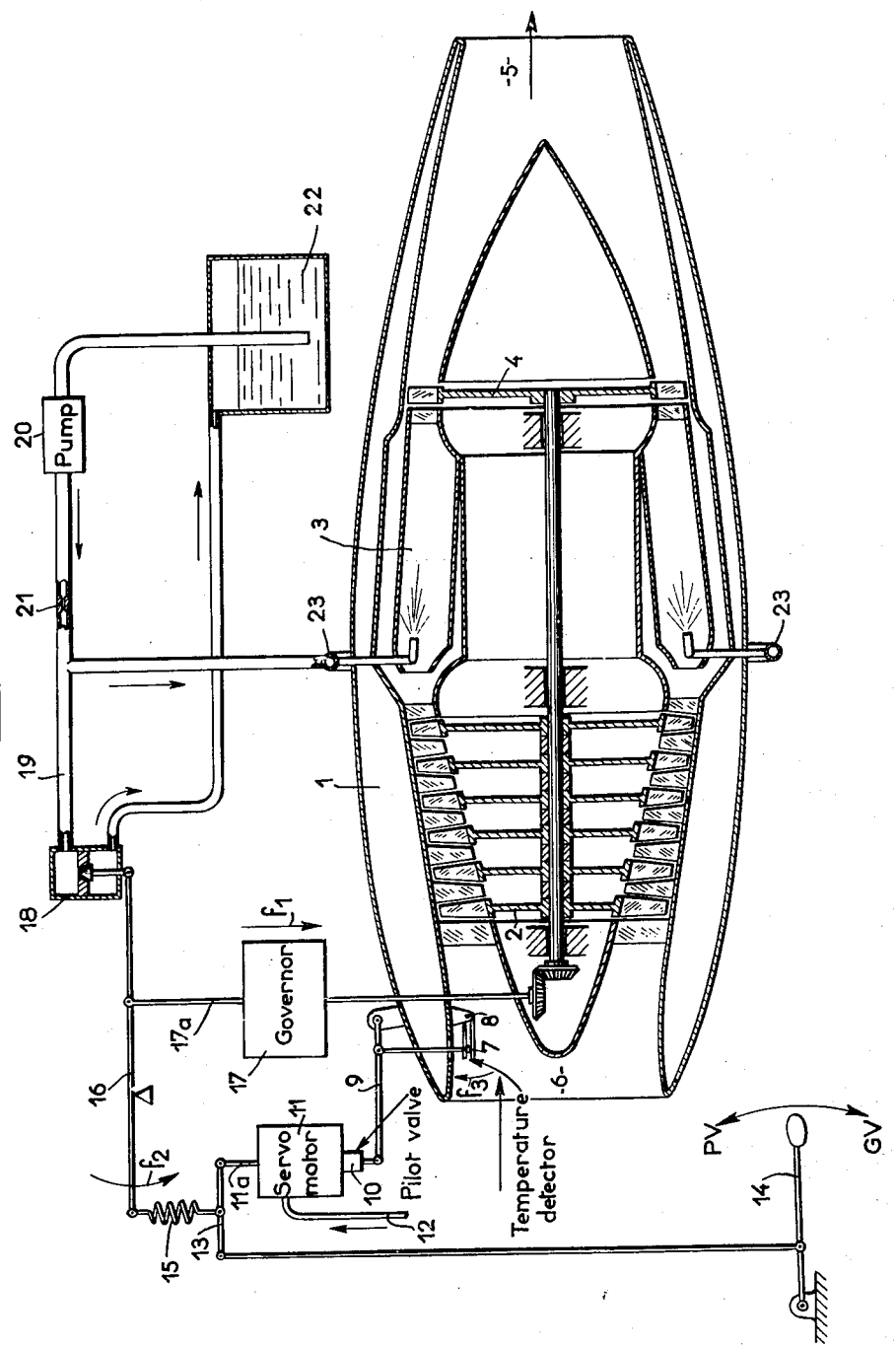

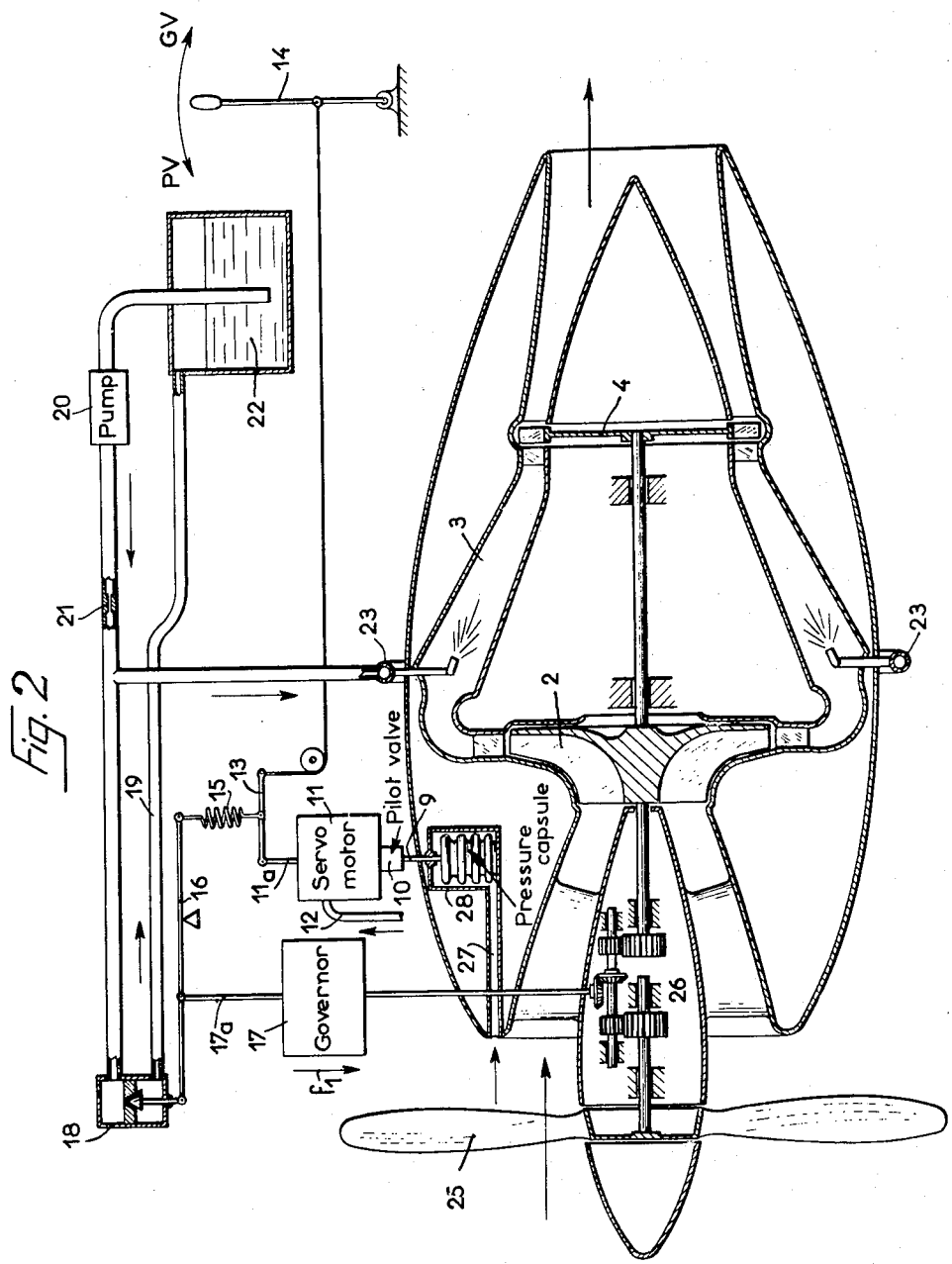

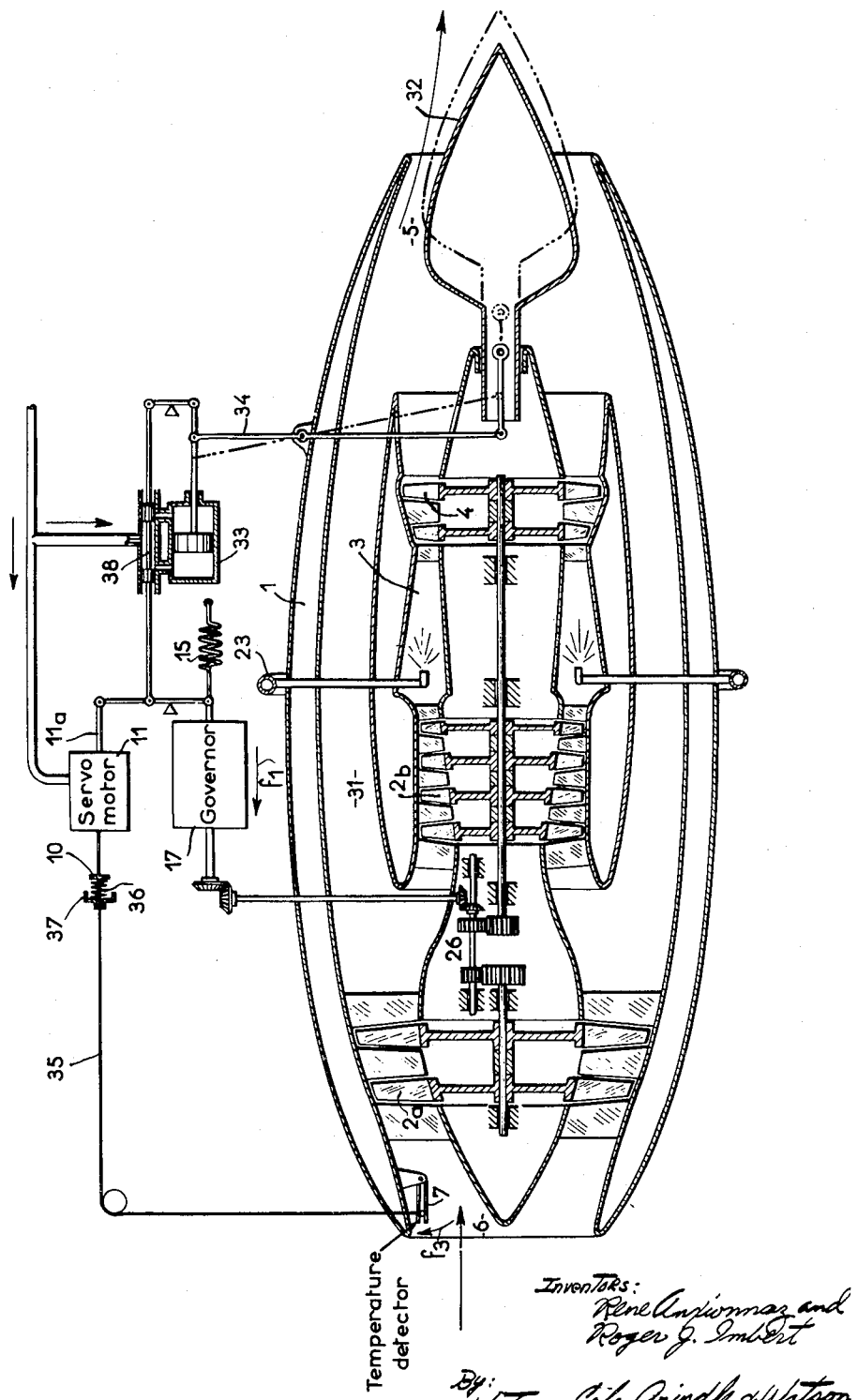

2,750,734

MOTIVE FLUID FLOW CONTROL DEVICE FOR TURBINE COMPRESSOR UNITS USED FOR AIRCRAFT PROPULSION

René Anxionnaz and Roger J. Imbert, Paris, France, assignors, by direct and mesne assignments, to Societe Rateau (Societe Anonyme), Paris, France, a company of France Application December 29, 1950, Serial No. 203,244

Claims priority, application France January 26, 1950

7 Claims. (Cl. 60—35.6)

It is known that the output of a fluid-flow engine of any type, whether fluid operated (turbine) or fluid actuating (blower or compressor) is unfavourably influenced when the speed of the fluid flow, absolute speed or speed relative to any fixed or movable element of the arrangement, approaches the speed of sound in this same fluid.

It is also known that this speed of sound in a given gas is proportional to the square root of the absolute or Kelvin temperature of this gas.

In a gas-turbine installation operating at a given speed and with a given flow passage cross-section, all the temperatures of the fluid or fluids in motion vary with the initial temperature of the thermal cycle, that is to say, with the temperature of the air on the suction side of the compressor feeding the gas turbine. Consequently, in a gas-turbine propulsion installation for aircraft in which the useful energy of the gases serves to drive a propeller through the turbine or through a turbine element or for direct propulsion by means of the reaction created by the ejection of these gases or of a mass of air compressed for this purpose, or of a mixture of these two fluids, the different temperatures of the fluid or fluids in motion depend in the first place upon the temperature of the air sucked in, which temperature, as is known, varies with the altitude of flight.

It therefore follows that in climbing, the speed of sound at any point of the machine will vary as the square root of the absolute temperature of the air sucked in, and that the ratio of the speed of flow to the speed of sound, or the Mach number, will vary correlatively and may exceed unity to the detriment of the output, if special precautions are not taken.

The present invention has for its object to provide a device for controlling fluid flow through a turbine compressor unit used for aircraft propulsion, this device ensuring during operation of such installations a Mach number lower than the given limit notwithstanding the variations of the ambient temperature which most frequently follow a variation in the altitude of flight.

In its most simple principle, the invention comprises a combination of a detector taking the temperature of the air at its admission into the compressor or another value which is a function of this temperature, and of regulating means for acting on the speed of flow of the fluid in motion, taking into account the local speed of sound indicated by the detector, in order to reduce the Mach number at each instant to a value below the fixed limit.

A further object of this invention is to provide means for connecting the detector and the regulating means together so that this regulation is entirely automatic.

The description which follows with reference to the accompanying drawings, which are given by way of non-limitative example, will enable the manner in which the invention can be carried into effect to be readily understood, the features appearing both from the drawings and from the text naturally forming part of the said invention.

Figure 1 shows a diagrammatic axial section through a single-flow turbo-jet engine provided with automatic regulating means according to the invention, in one form of embodiment of such means.

Figure 2 is a diagrammatic sectional view of a turbo-prop provided with regulating means according to the invention, in a second form of embodiment.

Figure 3 shows a diagrammatic sectional view of a two-flow jet propulsion unit provided with automatic regulaing means according to the invention, in a third form of embodiment.

In the embodiment shown in Figure 1, the invention is applied to the regulation of a single-flow turbo-jet engine comprising in a fairing 1 an air compressor 2, which in this example is of the multistage axial flow type combustion chambers 3 disposed in cylindrical form about the axis of the arrangement, a gas turbine 4 driving the compressor and a jet nozzle 5 producing the propulsive jet. At a point of the inner wall of the air intake 6 which serves for feeding the compressor is disposed a thermometric member which, in the example in question, is constituted by a bimetallic strip 7 having a fixed point at 8 and connected by its free end to a lever 9 acting on the pilot valve 10 of a hydraulically-operated servo-motor 11 of any known convenient type, which is, for instance, permanently fed with oil under constant pressure through a duct 12. The arrangements shown in the drawing correspond to the case where the bimetallic strip is so oriented that the element having a high coefficient of expansion is situated above, an increase in the temperature of the air admitted into the compressor thus tending to lower the lever 9 and vice versa. The pilot valve 10 which controls the servo-motor 11 is so arranged that, when the lever 9 is upwardly displaced, the servo-motor urges the rod 11a upwards, and inversely. The moving rod 11a of the servo-motor 11 is attached to the extremity of a rocking lever 13, the other end of which is connected to the hand lever 14 by means of which the pilot can regulate the fuel feed to the combustion chamber 3. An intermediate point of the rocking lever is connected to a spring 15 fixed at its other end to one end of a rocking lever 16, an intermediate point of which is connected to the moving rod 17a under control of a centrifugal governor 17 which urges this rod downwards, in the direction $f_1$ when the R. P. M. increases, and inversely. The opposite end of this lever 16 acts on a valve 18. This valve controls a by-pass 19 affording communication between the delivery of the fuel pump 20 on the downstream side of a calibrated throttle 21 and the fuel tank 22.

Under these conditions, if for example the pilot lowers the hand throttle lever 14 in the direction GV in order to increase the feed of fuel to the chambers 3, which tends to increase the speed of rotation of the assembly, all other parameters remaining unchanged, the tension of the spring 15 is increased. Consequently, the rocking lever 16 rocks in the direction of the arrow $f_2$ and reduces the outlet aperture of the discharge valve 18. It follows that the fuel feed pressure in the ducts 23 feeding the burners, which was previously lower than the delivery pressure of the fuel pump 20 on the upstream side of the throttle 21 owing to the throttling which takes place at the latter and the escape at 18, approaches this pressure and that the fuel delivery into the chambers 3 increases. The speed of rotation of the gas turbine and of the compressor will therefore be accelerated until the centrifugal governor 17 balances the new value of the tension of the spring 15 while tending to re-open the valve 18, the lift of which thus corresponds to a given running of the system.

However, for a given position of the hand throttle lever 14, the tension of the spring 15 is also related to the position of the servo-motor 11, which position is in turn defined by the form of the bimetallic thermostat 7 located in the current of sucked-in air, before the first stage of the compressor.

Consequently, if the temperature of the air flux sucked in decreases, which tends to reduce the speed of sound and to increase the Mach number, the consequent deformation of the bimetallic strip 7 in the direction of the arrow $f_3$ produces the upward displacement of the rod 11a of the servo-motor 11. This displacement produces through the rocking lever 13 a reduction in the tension of the spring 15, which results in a new state of equilibrium of the system for a lower speed of rotation of the turbo-jet unit such that the Mach number is maintained. It is to be noted that the temperature considered is the apparent temperature of ambient air, i. e. the actual temperature of this air plus an increase due to adiabatic compression caused by the ram effect which depends on the speed of the aircraft. Hence this temperature is the real temperature, at the inlet to the compressor, of the air which is to perform the motive cycle.

By a judicious adaptation of the various elements described and of the dimensions of the engine, it is therefore possible to obtain at the different points of the cycle a speed of rotation of the assembly which is automatically supervised and limited to a value in the neighborhood of that which corresponds to the fixed limit of the Mach number, regardless of the temperature variations of the air admitted, even if the pilot places the control lever 14 in the position for high speed.

Thus, the rotors of the compressor may have increasing diameters, as shown in the drawings and described in U. S. Patents Nos. 2,396,911 and Re. 23,198 this being permitted by the increase in the speed of sound due to the increase in the temperature of the air by compression.

By way of example, Figure 2 shows another embodiment of the invention as applied to a turboprop unit comprising an air screw 25 driven by a gas turbine 4 through a reduction gear 26. The gas turbine also drives its feed compressor 2 which, in the example shown, is a single stage centrifugal compressor. With such an assembly the same phenomena prejudicial to the output arise when the air speed relative to the fixed or movable elements of the engine (screw, compressor or turbine) approaches the speed of sound. It is therefore possible to employ means for automatically regulating the speed of rotation of the assembly as a function of the temperature of the air, similar to those hereinbefore described with reference to Figure 1.

However, the example of Figure 2 shows an arrangement for indicating the temperature which differs from the thermometric arrangement shown in Figure 1.

It is known that in the atmosphere, at any rate at altitudes lower than 11,500 metres, the pressure and the temperature of air are practically related to one another so that it is possible, by detecting or measuring the pressure of this air, for example with the aid of a Pitot tube, to determine its temperature without making an appreciable error. As in the previous case, the measured pressure (and hence the temperature) is the apparent pressure of ambient air, i. e. the actual pressure plus an increase due to the ram effect caused by the speed of the aircraft. Hence, as before, this is the real pressure of the air at the intake of the compressor, that is the air which is to perform the motive cycle. However, it is obvious that Pilot tube 27 can be located anywhere on the aircraft, for instance on the leading edge of the wings, since the ram pressure will be the same.

In the example of Figure 2, it is this total pressure detected by the Pitot tube 27 which acts through a conventional pressure capsule 28 or any convenient barometer, on the pilot valve 10 of a servo-motor 11 which in turn acts on the rocking lever 13. All the other arrangements are similar to those described with reference to Figure 1 and bear the same reference numerals.

The foregoing embodiments are based on the fact that in any rotary fluid-flow engine, the speeds of flow of the fluid in motion are related, at a given flow passage cross-section to the speed of rotation of the engine.

Further embodiments of the invention may be conceived on the basis of the fact that with constant speed of rotation the relative speeds of flow of the fluid in motion are related to the output of fluid passing through the engine, that is to say, to the general flow passage cross-section of the circuit.

Therefore, in order to limit the Mach number in operation, the passage cross-section through the circuit of the motive fluid, and more particularly the outlet free section, may be adjusted in accordance with the temperature of the air.

Figure 3 concerns an embodiment of this nature as applied by way of example to a two-flow turbo-jet comprising in the fairing 1 a low-pressure compressor 2a and a high-pressure compressor 2b, both driven by a two-stage gas turbine, the former through a reduction gear 26. Part of the air delivered by the low-pressure air compressor 2a passes directly towards the jet nozzle 5 through the bypass 31, while the remainder of this air feeds the high-pressure compressor 2b, then expands in the turbine 4 and finally mixes with the air of the by-pass 31 to form the driving jet. The jet nozzle is provided with an axially movable needle 32 for the regulation of its free section (this needle therefore regulates the opening of the circuit). The displacement of this needle is controlled by the piston of the hydraulic jack 33 through a lever 34. A bimetallic thermometric detector 7 similar to that described with reference to Figure 1 is disposed in the air intake 6, and acts on the pilot valve 10 of the servo-motor 11 through a cable 35 tensioned by a spring 36 bearing against a fixed abutment 37. The moving element 11a of the servo-motor 11 influences as in Figure 1 the tension of the spring 15 of the centrifugal governor 17 and the position of the slide valve 38 of the hydraulic jack 33. Consequently, for a given speed of rotation of the turbine and of the compressors corresponding to a position of equilibrium of the centrifugal governor 17, any temperature variation modifies the degree of opening of the needle 32, that is to say, the opening of the circuit. Lowering of the temperature, for example, which tends to increase the Mach number, results in a displacement of the needle 32 towards the position shown in dot and dash lines, which reduces the opening of the circuit and tends to re-establish the initial Mach number.

Naturally, embodiments of the nature shown in Figures 1 and 3 could be combined, that is to say, the variations of the temperature detected on the upstream side of the compressor could be made to act simultaneously (either directly or through the pressure of the air) both on the speed of rotation of the engine and on the regulation of the opening of the circuit.

What we claim is:

1. In combination with a jet propulsion unit having a gas turbine and an air compressor, a Mach number control device comprising a governor responsive to the speed of said unit, means for adjusting the velocity of the motive fluid flow through said unit, means responsive to the air temperature at the inlet to said compressor, and transmission means for bringing said flow adjusting means under the conjugate control of said governor and said temperature responsive means, the arrangement of said transmission means being such that the motive fluid flow is slowed down as the air temperature decreases and accelerated as the air temperature increases, whereby the maximum Mach number of said motive flow is maintained at an imposed value irrespective of variations in air temperature.

2. The combination according to claim 1, wherein the predetermined maximum value of the Mach number is one.

3. The combination according to claim 1, wherein the temperature responsive means is a thermometric device including a bi-metallic strip arranged at the inlet to said compressor.

4. The combination according to claim 1, wherein the temperature responsive means is a barometric device including a Pitot tube for measuring the ram pressure of air.

5. The combination according to claim 1, further comprising hand actuated means for controlling said transmission means.

6. The combination according to claim 1, wherein the flow adjusting means comprises a combustion chamber between said compressor and said gas turbine, means for supplying fuel to said combustion chamber, and valve means for controlling said fuel supply, said valve means being actuated by said transmission means, the arrangement being such that the fuel supply is decreased as the temperature of air decreases.

7. The combination according to claim 1, wherein the flow adjusting means comprises a propelling nozzle connected to the exhaust of the gas turbine, and means for varying the flow area of said nozzle, said last-mentioned means being controlled by said transmission means, the arrangement being such that the flow area is decreased as the temperature of air decreases.

References Cited in the file of this patent

UNITED STATES PATENTS

| | | |
|---|---|---|
| 2,498,939 | Bobier | Feb. 28, 1950 |
| 2,545,703 | Orr | Mar. 20, 1951 |
| 2,557,526 | Bobier | June 19, 1951 |
| 2,564,127 | Orr | Aug. 14, 1951 |

FOREIGN PATENTS

| | | |
|---|---|---|
| 626,297 | Great Britain | July 13, 1949 |

OTHER REFERENCES

Treseder: "Requirements in Turboprop Propellers," S. A. E. Journal, February 1949, pp. 26–29.